Patented Mar. 23, 1943

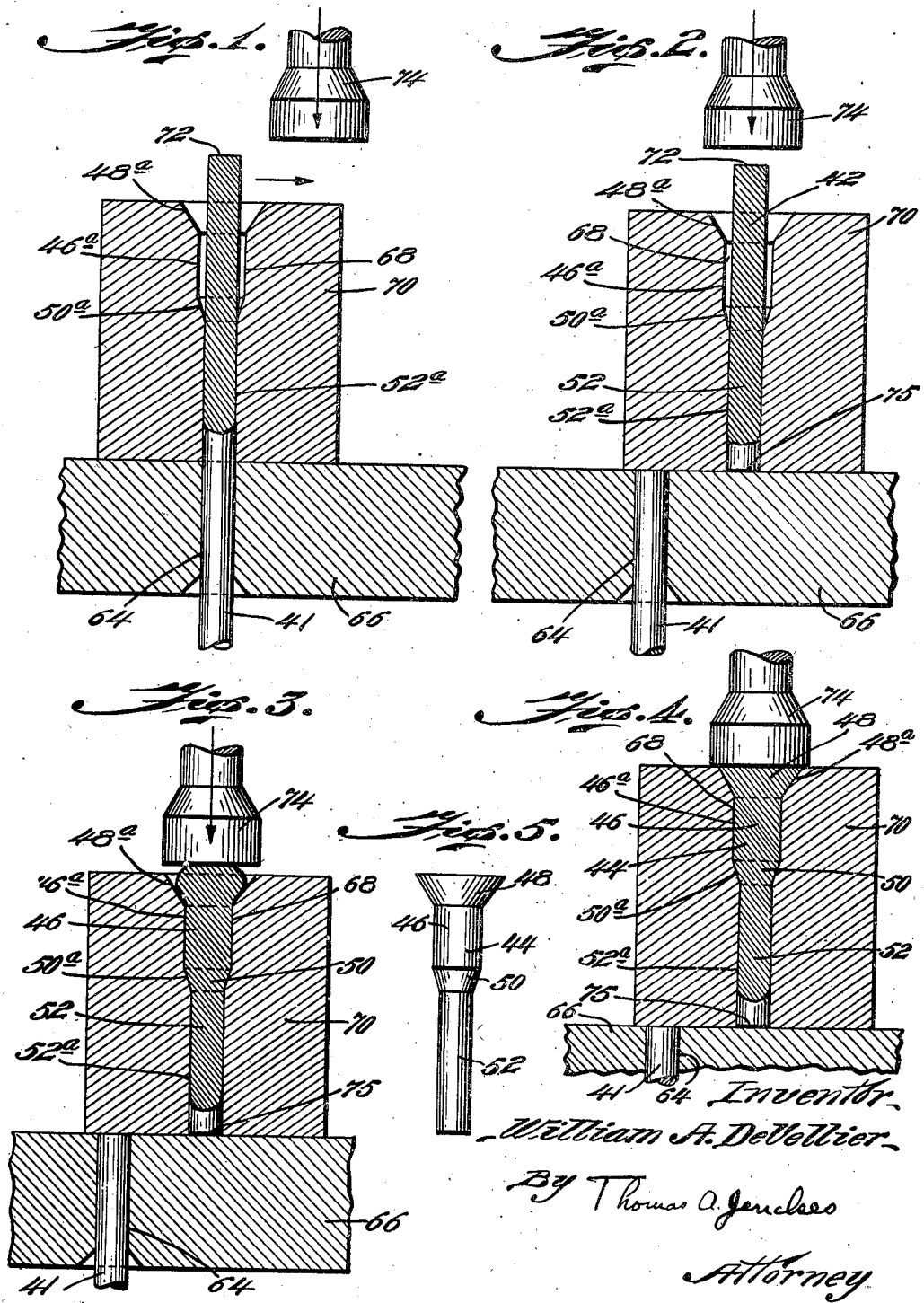

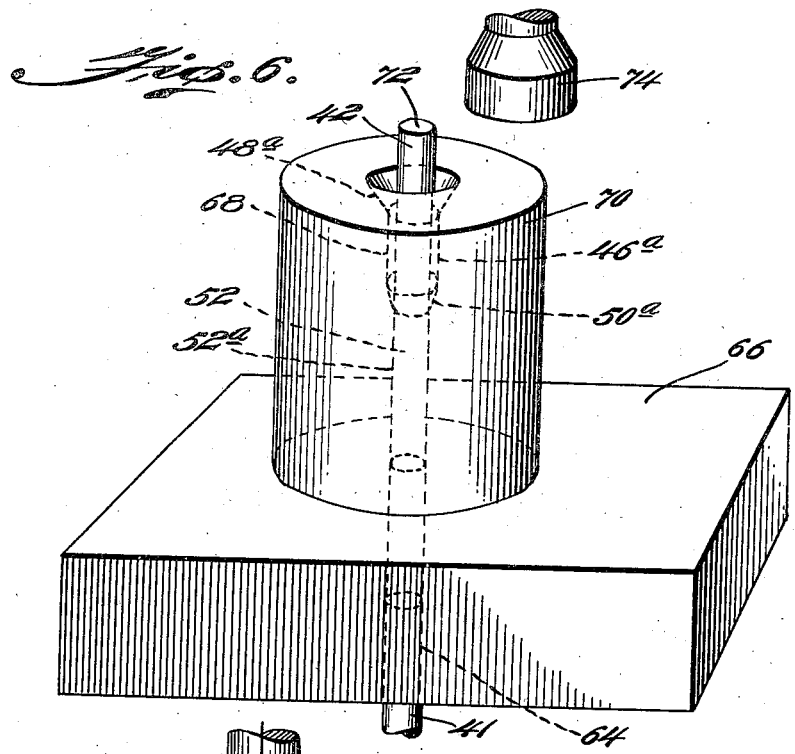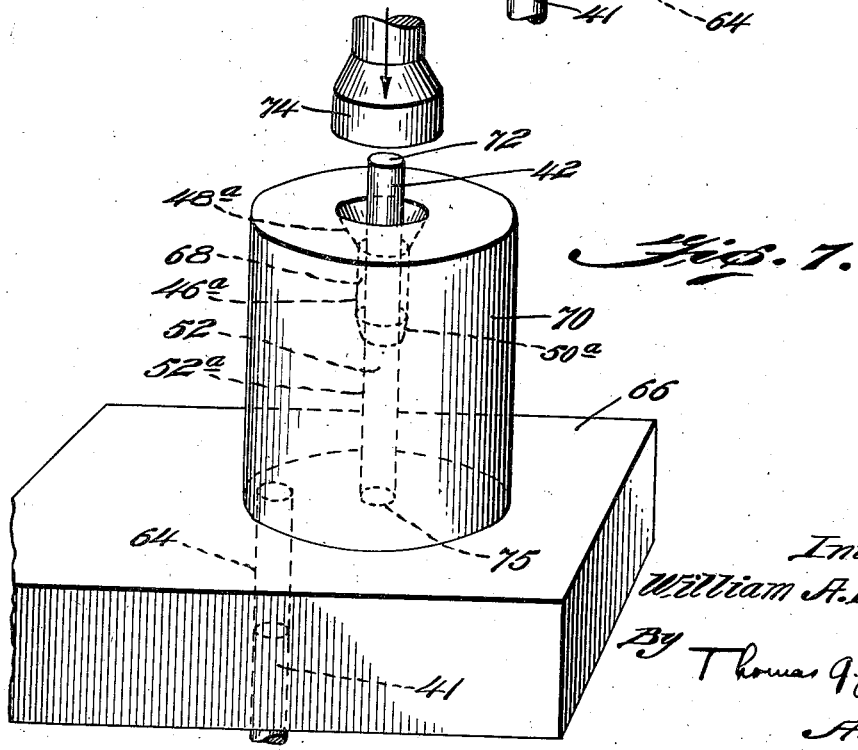

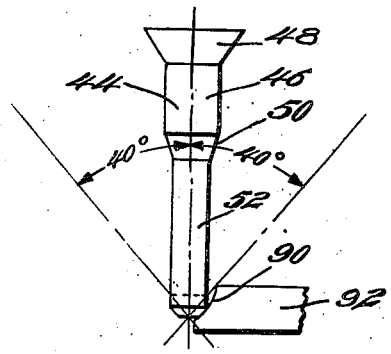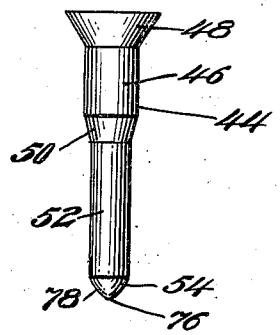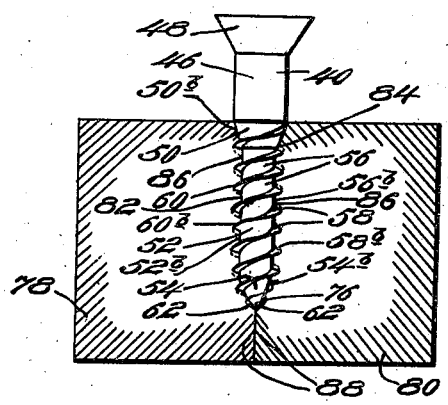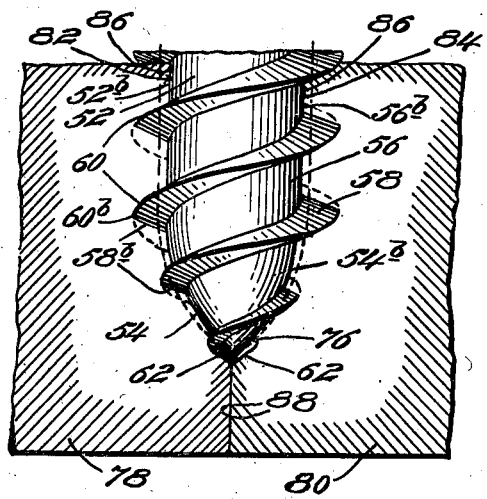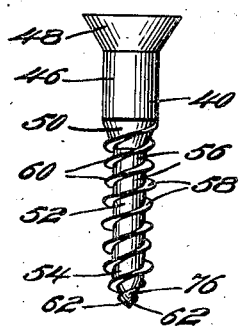

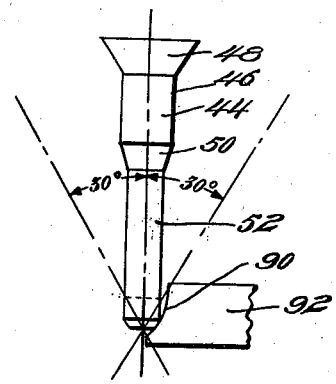
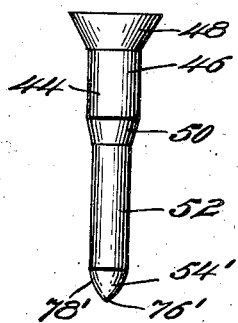
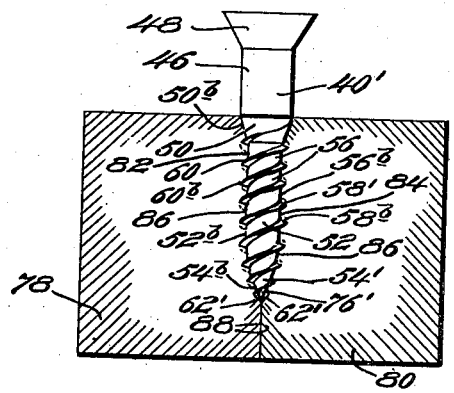
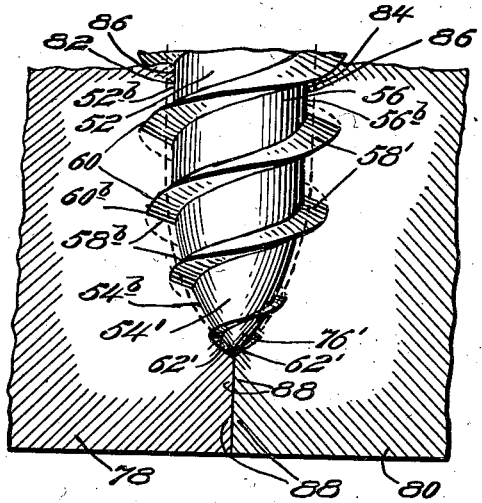
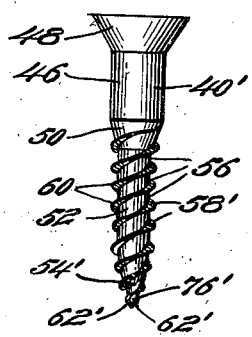

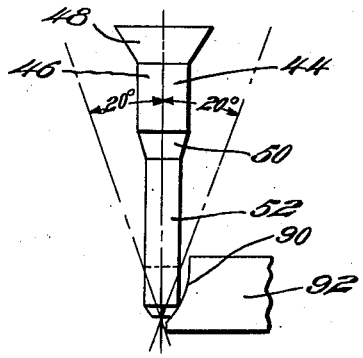
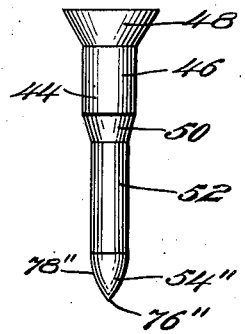
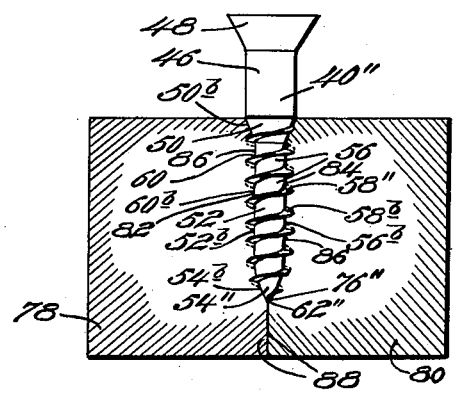
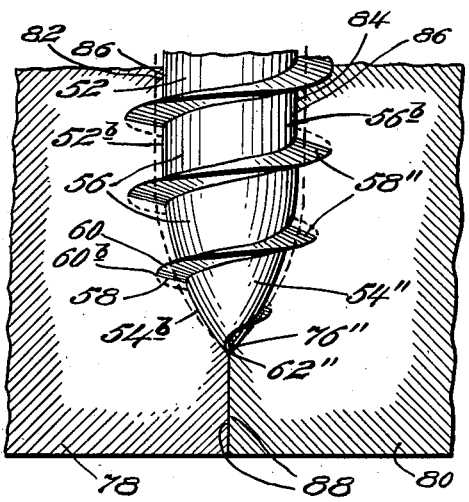
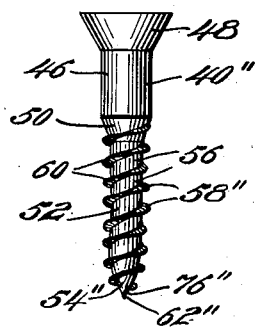

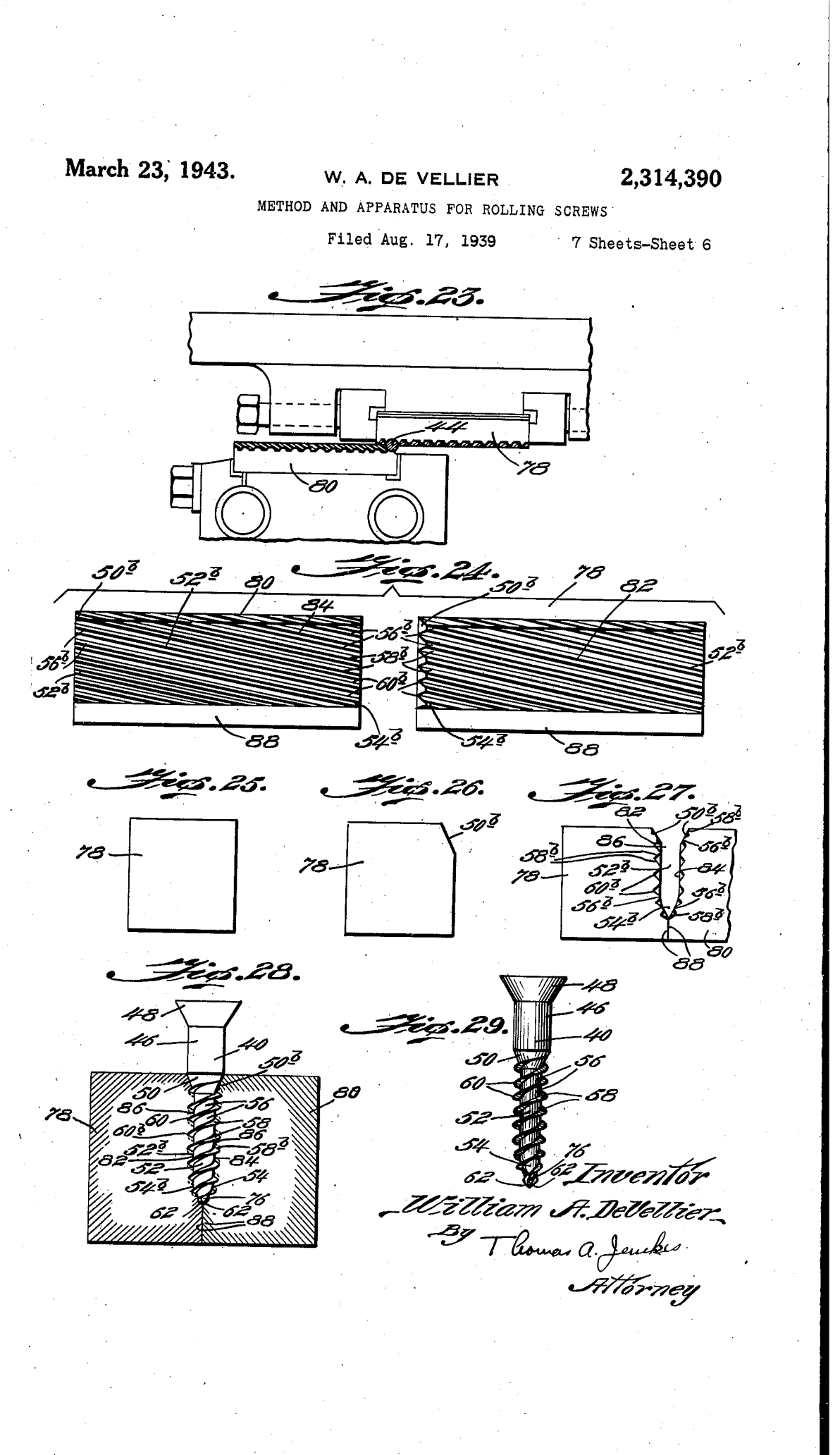

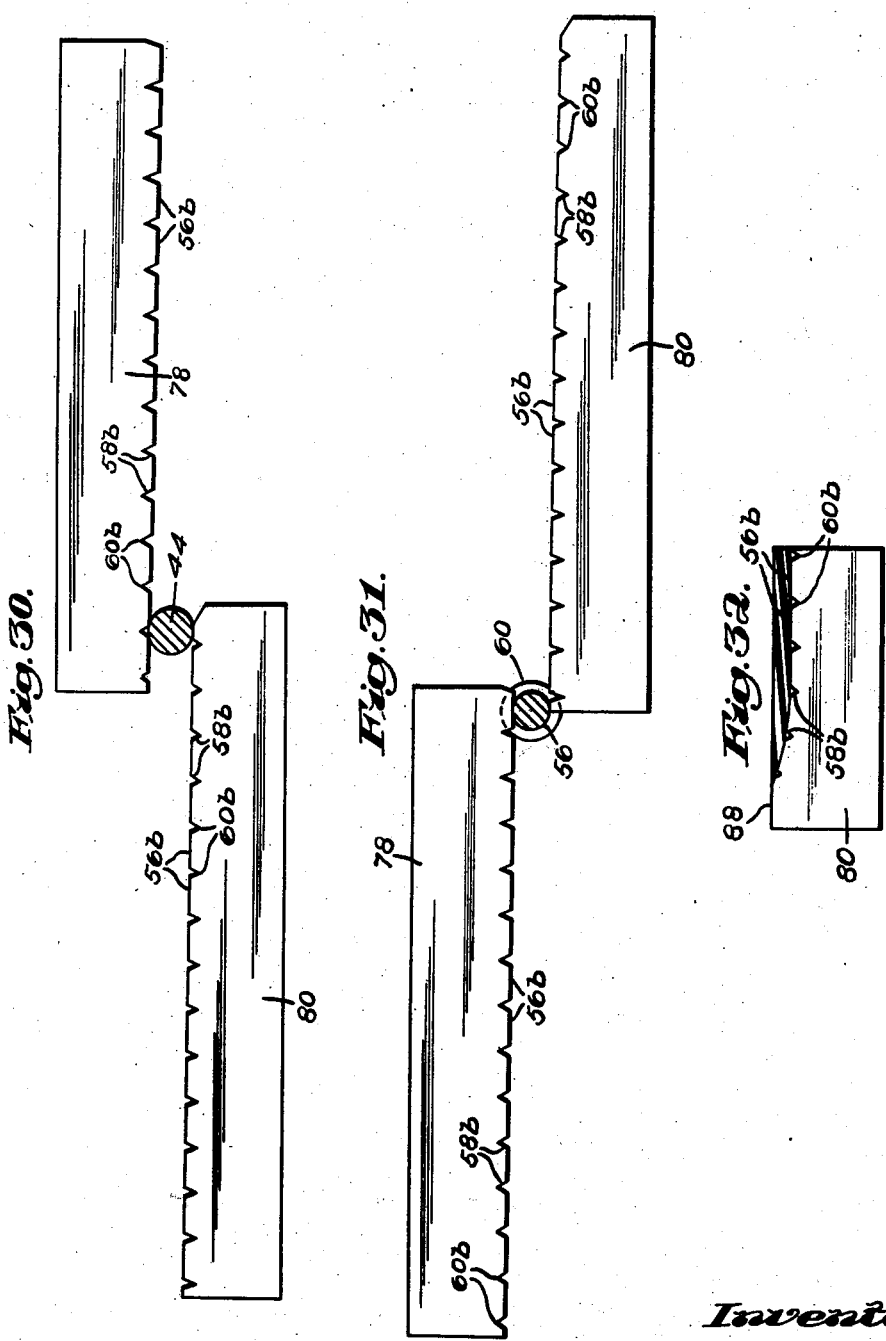

2,314,390

UNITED STATES PATENT OFFICE 2,314,390

METHOD AND APPARATUS FOR ROLLING SCREWS

William A. De Vellier, Newark, N. J., assignor to New Process Screw Corporation, Waterville, Conn., a corporation of Delaware Application August 17, 1939, Serial No. 290,621

8 Claims. (Cl. 80—9)

My invention relates to improvements in methods of manufacture of screws and includes, in addition, novel types of apparatus for carrying out said methods. While my invention is particularly adapted for use in producing the double thread single point screw, shown in Arenz Patent No. 1,912,879, it is obvious that I may also employ it in the manufacture of other types of screws, whether employing a single or multiple thread.

My invention particularly relates to the precision manufacture of screws in which the manufacturing machines are so designed as to use up all the metal and thereby produce no waste. In the usual manufacture of screws by cutting threads thereon, at least 33% of the metal is cut away and wasted. With my inproved precision method of rolling, as heretofore stated, no waste at all is produced.

Further features of my invention relates to the speed at which it is possible to manufacture screws employing my improved method, permitting one to roll ten times as many screws as it was possible to make in the prior art by cutting methods.

A further feature of my invention resides in the fact that inasmuch as the machines employed are precision machines, absolute uniformity in the finished product results.

A further object of my invention is to provide screws having more inherent strength than otherwise heretofore produced.

A further feature of my invention resides in the fact that employing my improved rolling method I am able to provide each thread with a sharp razor-like cutting edge.

An additional feature of my invention resides in the fact that I do not disturb the portion of the screw blank to be rolled by any type of extrusion, thus leaving the actual rolling operation as the only shaping operation performed on this portion of the screw blank, to give it more inherent strength and to eliminate the scale which is sometimes present on metal that has been overworked.

A further feature of my invention, particularly when making the type of screw shown in said Arenz patent, is to provide a screw having sufficient metal at the tip thereof to form a sharp diametric cutting edge, thus providing an incising blade projecting axially forwardly from each opposite side wall of the pointed portion thereof.

A further feature of my invention resides in the fact that I am able to manufacture my invention from a wire of smaller size than employed formerly, specifically being able to employ a wire of .216" diameter as against a wire of .242" diameter to make a #14 screw, thereby additionally effecting a considerable saving in the cost of the wire.

Further features of my invention relate to improvements in the blank extrusion method and apparatus, and also improvements in the rolling method and apparatus.

Further features of my invention reside in improvements in the novel type of screws produced thereby.

These and such other objects of my invention as may hereinafter appear may be best understood from a description of embodiments thereof, such as are shown in the accompanying drawings.

In the drawings, Figs. 1-4 are diagrammatic sectional views illustrating the steps in the method I preferably employ to form a screw blank, Fig. 1 illustrating the initial step of feeding the wire through a hole in the base and an aligned axial hole in the die to a predetermined point above said die, Fig. 2 illustrating the relative lateral movement between the die and base to cut off said wire to leave the lower end of said piece of wire resting on said base and to move the piece of wire directly underneath the punch, Fig. 3 illustrating the application of the first punching blow to the piece of wire to shape the tapered and body portions of the blank to the desired shape, and Fig. 4 illustrating the application of the second punching blow to cause the metal to flow obliquely and radially outwardly to form the head.

Fig. 5 is a side elevation of the blank produced by the steps heretofore described.

Fig. 6 is a diagrammatic perspective view of the blank forming apparatus including its base, die and punch, with the wire fed through the hole in the base and aligned axial hole in the die to the desired predetermined height.

Fig. 7 is a perspective view of the parts shown in Fig. 6 after the die has been relatively moved over the base to cut the wire to a predetermined length and to bring it in position immediately below the punch.

Figs. 8-12 illustrate additional steps in the method of making one embodiment of screw produced by my invention, namely a double-threaded screw of the Arenz type having a widely domed point to provide sufficient metal therein for its diametric cutting blades, Fig. 8 being a diagrammatic view illustrating the step of obliquely removing metal from the lower end of said blank to provide a conical point having a supplementally outwardly domed wall thereon, Fig. 9 being a side elevation of the thus pointed screw blank, Fig. 10 being a diagrammatic sectional view illustrating the step of rolling the threads between two suitably shaped dies, Fig. 11 being an enlarged diagrammatic sectional view of the tip of the pointed portion of the rolled screw and adjacent portions of the dies shown in Fig. 10 and Fig. 12 being a side elevation of the completely rolled single point double threaded screw produced by my invention.

Figs. 13-17 illustrate additional steps in the method of making another embodiment of screw, namely a double threaded screw of the Arenz type having a sharper point, Fig. 13 being a diagrammatic view illustrating the step of obliquely removing metal from the lower end of said blank to provide a conical point, Fig. 14 being a side elevation of the thus pointed screw blank, Fig. 15 being a diagrammatic sectional view illustrating the step of rolling the threads between two suitably shaped dies, Fig. 16 being an enlarged diagrammatic sectional view of the tip of the pointed portion of the rolled screw and adjacent portions of the die shown in Fig. 15 and Fig. 17 being a side elevation of such a completely rolled double threaded screw produced by my invention.

Figs. 18-22 illustrate additional steps in the method of making another embodiment of screw, namely a single threaded more sharply pointed screw, Fig. 18 being a diagrammatic view illustrating the step of obliquely removing metal from the lower end of said blank to provide a conical point, Fig. 19 being a side elevation of the thus pointed screw blank, Fig. 20 being a diagrammatic sectional view illustrating the step of rolling the threads between two suitably shaped dies; Fig. 21 being an enlarged diagrammatic sectional view of the tip of the pointed portion of the rolled screw and adjacent portions of the dies shown in Fig. 20 and Fig. 22 being a side elevation of such a completely rolled threaded screw produced by my invention.

Fig. 23 is an enlarged fragmentary plan view of the thread rolling apparatus I preferably employ showing the dies and a screw blank in position to be rolled.

Fig. 24 is a view of the thread forming faces of the companion dies which roll the threads on the screw blank.

Figs. 25-27 illustrate my improved method of forming these dies, Fig. 25 being an end elevation of a die blank, Fig. 26 being a view similar to Fig. 25 after a portion of said die adjacent one edge thereof has been removed, and Fig. 27 being a view similar to Fig. 26 after the blank receiving cavity and threads have been cut thereon.

Fig. 28 is a diagrammatic sectional view of the dies showing the screw being rolled therebetween.

Fig. 29 is a side elevation of a completed double threaded single pointed screw constructed by my improved method.

Fig. 30 is an enlarged diagrammatic plan view of the thread rolling dies about to engage the screw blank at the beginning of their stroke and illustrating the fact that the lower walls of the cavity are slightly inclined upwardly from front to rear.

Fig. 31 is a plan view similar to Fig. 30 illustrating the dies at the end of their stroke after they have rolled a screw from the blank shown in Fig. 30.

Fig. 32 is an end elevation of the stationary die 80.

In the drawings, wherein like characters of reference indicate like parts throughout, 40 generally indicates a rolled thread screw constructed in accordance with my invention.

As illustrated in Figs. 1-7, my improved method includes the steps of striking an end of a confined piece of wire 42 of such greater length than the finished blank 44 to provide the desired amount of metal in said finished blank with such force as to cause the metal in the upper portion of said piece of wire to flow axially and radially to form the upper portion of said piece 42 into a blank body portion 46 of greater circumference than that of the original piece of wire 42, with an outwardly tapered head 48 above said circumferentially expanded body portion and an inwardly tapered portion 50 below said expanded body portion while confining the lower end 75 of said piece of wire 42 and lower portion 52 thereof below said inwardly tapered portion 50 to a lower shank portion 52 having the original circumference of said wire. I then suitably point the lower end of said screw blank 44 to provide a suitable pointed portion 54. I then roll threads through the tapered, shank and pointed portions 50, 52 and 54 respectively, as illustrated in Figs. 8-28 and Figs. 30-32, by applying radial inward pressure at equally spaced lanes extending spirally of said portions to force the metal radially inwardly to form equally spaced spiral lands 56 and permitting the displaced metal to flow radially outwardly between said spiral lanes of pressure while confining said radial outward flow to sharp equally spaced ridge means of substantially the circumference of said blank body portion 46 to provide continuous spiral thread means 58 tapering to a sharp cutting edge 60 of substantially the circumference of said blank body portion 46 extending spirally downwardly through said portions of progressively increasing height in said tapered portion 50, of substantially equal height throughout said shank portion 52 and of progressively decreasing height in said pointed portion 54 and terminating in a cutting edge 62 at the tip thereof, the inward radial pressure being predetermined to extrude the metal radially inwardly in said pressure lanes in an amount sufficient only to extrude sufficient metal radially outwardly to form said threads.

While the various steps of my improved method may be performed on any suitable type of apparatus, I have illustrated in the drawings my preferred apparatus for performing my improved method. As shown in Fig. 6, a continuous length of wire 41 is fed through a suitable hole 64 in a base 66 and through an axial hole 68 in a die to a predetermined point 72 above said die to provide a piece of wire 42 of a length to provide the desired amount of metal in the formed blank 44. Said axial die hole 68 has a blank shank forming portion 52a at the lower end thereof of substantially the circumference of said piece of wire 42, an outwardly upwardly tapered portion 50a above said shank forming portion 52a, a blank body forming portion 46a of greater circumference above said tapered portion 50a and an outwardly and more sharply tapered head blank forming portion 48a terminating substantially flush with the upper end of said die 70. As shown in Figs. 6 and 7, the extrusion punch preferably includes three parts, namely the base 66, the die 70 and the punch 74. Means are provided to relatively laterally move said die 70 relative to said base 66 to cut off a piece 42 of said wire 41 to leave the lower end 75 of said piece of wire 42 resting on said base 66 and bringing the hole 68 containing the piece of wire 42 in alignment with the punch 74. I have found that best results can be obtained by providing a taper in the tapered portion 50 of said blank or 50a of said die of between 18°-26°, the metal extruding at this angle without any cleavage or fracture or appreciable weakening of its crystalline structure. I then, by suitable sharp lowering of the punch 74, apply a punching blow to the upper end 72 of said piece of wire 42, as illustrated in Fig. 3 (the lower end 75 of said piece of wire 42 resting against said base 66), to shorten the wire axially and to cause it to flow obliquely and radially outwardly to fill up the tapered portion 50a of said die hole 68 to form the tapered portion of said blank and also to fill up said blank body portion 46a of said die to form the body portion 46 of said blank of relatively larger diameter. I then as shown in Fig. 4, apply a second punching blow of the punch 74 to the then shortened upper end of said wire to further shorten said wire axially and to cause the balance of the wire stock above said die 70 to flow obliquely and radially outwardly to fill up the more sharply tapered head blank forming portion 48a of said die to form the head 48 in said blank 44. The screw blank may be then suitably removed from said die.

I then suitably point the lower end of said screw blank to provide it with a pointed portion 54 terminating in a point 76. While this may be done in a suitable extrusion pointing machine or in any other suitable manner, in the preferred embodiment shown, I preferably form the pointed portion 54 by obliquely removing metal from the lower end of said blank to form said conical pointed portion 54. If I desire to make a double threaded screw of the type heretofore referred to, the blank is preferably provided with a 40° cone and with the side wall 78 of said conical portion 54 supplementally outwardly domed 3° to 5° more. It is obvious that in this stage of its manufacture, my improved screw blank adapted to have screw threads rolled thereon comprises a piece of wire having a pointed lower portion 54, a shank portion 52 of uniform circumference above said pointed portion 54, an outwardly upwardly tapered portion 50 above said shank portion, an expanded body portion 46 of uniform circumference greater than that of said shank above said tapered portion and an outwardly flaring head 48 above said body portion 46 having a flat upper surface adapted to have the desired resistance formed therein, whether it comprises the usual slot for receiving the end of a flat screwdriver, a truncated diamond as shown in my Patent No. 2,218,701, or a Phillips recess or other type of slot. If desired, the wall 78 of the conical point 76 may be provided with an excess of metal thereon greater than required for a conical point of any suitable shape in any suitable manner and for this purpose may be supplementally outwardly domed, and I preferably employ a conical pointed portion of between 30° to 40°, if I desire to roll the double threads of the type shown in said Arenz patent and to provide the desired diametric cutting blades 62 thereon. It will be apparent that every step in the forming operation is predetermined, the piece of wire 42 being cut off at such a length as to be exactly extruded outwardly to fill the respective tapered portion forming cavity 50a, the body forming cavity 46a and the head forming cavity 48a without providing any excess metal.

As stated, two additional features of my invention relate to improvements in the method of and apparatus for rolling threads on my improved screw blank. I may employ any standrd type of rolling apparatus, such as shown in the Arenz Patent No. 1,912,879, Fig. 23 being a diagrammatic plan view of the apparatus shown in said patent. It will be noted, however, that in the structure shown in said Arenz patent, the diametric cutting blades 62 of said threads adjacent the point 76 and the point 76 itself are formed by an axial extrusion, the dies 8 and 9 shown in said patent being separated for this purpose. Employing my improved method, however, I keep the faces of the cooperating dies in contacting engagement at all times, thereby substantially eliminating any axial extrusion and limiting the extrusion to radial inwards and radial outwards extrusion, said radial extrusion tapering off obliquely in said pointed portion 54 as the point 76 of the screw is reached. The threads 58 are rolled on the tapered portion 50, the shank 52 and pointed portion 54 of said blank only, and for this purpose I relatively move a movable die 78 in contacting engagement over a stationary die 80, while confining the tapered, shank and pointed portions 50, 52 and 54 respectively of said blank 44 between the faces 82 and 84 of said respective dies, each respective face 82 and 84 of said respective dies comprising a continuous cavity 86 having a cooperating inwardly tapered portion 50b adjacent an edge thereof, a cooperating shank forming portion 52b and a pointed portion 54b tapering outwardly to the surface 88 of said respective die beyond said cavity 86 substantially abutting the opposite die surface, all of said respective portions 50b, 52b and 54b being of less respective depth than the radii of the respective corresponding blank portions 50, 52 and 54 to extrude metal from said blank radially inwardly to form continuous spaced lands 56 in said portions, each respective face 82 and 84 having equally spaced continuous thread forming groove means 58b therein, each terminating in a sharp inner intaglio ridge 60b, extending obliquely inwardly thereof to a depth substantially that of the radius of the blank body portion, from the outer surface 88 of said die at equally spaced distances throughout the height of said respective face through said tapered, shank and pointed portions 50b, 52b and 54b respectively of progressively increasing depth in said tapered portion 50b, substantially equal depth in said shank portion 52b and of progressively decreasing depth in said pointed portion 54b to receive the metal extruded radially outwardly by said lanes of pressure and confine it to form continuous threads 58, each tapering outwardly to a sharp spiral cutting edge 60 of substantially the circumference of said body portion 46 in said tapered, shank and pointed portions 50, 52 and 54 and of progressively increasing height in said tapered portion 50 due to the taper of said portion, even height through said shank portion 52 and progressively decreasing height in said pointed portion 54. If the respective grooves 58b are of a shape and number to provide a double thread of the Arenz type, it is obvious that the respective two double threads 58 will each terminate in a respective cutting edge 62 at the tip thereof in diametric relationship to the cutting edge 62 of the other thread 58, each tapering downwardly to a point coincident with the point

76 of said screw stem as shown in Figs. 8–22. It will be observed that the two respective dies 78 and 80 are of unitary construction throughout, thereby eliminating all errors in matching up parts, as found objectionable in the Arenz type die. It will be also noted that a similar precision method of rolling takes place, the surface of the equally spaced lands 56$b$ thus formed on the dies in said portions 50$b$, 52$b$, and 54$b$ between the equally spaced grooves 58$b$ therein, being flat to provide the desired lanes of pressure, with the respective grooves 58$b$ being of a predetermined height to extrude sufficient metal radially inwardly only to positively extrude just sufficient metal radially outwardly to form the respective threads 58 without any waste of metal at all.

The lanes 56$^b$ and the grooves 58$^b$ are preferably as in the embodiment shown of substantially equal width throughout their length and the lands 56$^b$ are preferably inclined slightly upwardly as shown in Figs. 30–32 from the front to the rear of each die to provide the predetermined progressively increasing radial pressure heretofore referred to while the faces 88 of each die are maintained in contact at all times to prevent axial extrusion at the tip. It is obvious that with this construction the equally spaced lanes of equal width in each die will come progressively closer to each other to progressively compress said equally spaced lands on the screw and progressively force a larger amount of metal into said equally spaced grooves of equal depth and width as the screw is rolled.

Figs. 25–27 illustrate a method of making such a die, which comprises obliquely removing a portion of said die adjacent one edge thereof by cutting or otherwise to form the tapered wall 50$b$ and then concaving the face of the die with a screw blank concavity 86 of the desired shape and suitably forming the thread forming grooves 58$b$ in said cavity, preferably by a suitable hob whereby the thread forming grooves are of progressively less respective depth in the tapered portion 50 of the screw blank opposite said tapered die wall 50$b$. It will be noted that the top die 78 is mounted in its respective machine part so as to have the face 88 thereof contactingly engage the cooperating face 88 of the stationary die 80 in use.

I have shown in the drawings three different embodiments of screws which may be rolled by my invention, Figs. 8–12 illustrating a double thread single point screw of the Arenz type terminating in tapered or pointed diametric cutting edges 62 at the tip 76 thereof. In all embodiments in my invention it will be noted that there is substantially no axial extrusion, the amount of metal extruded radially outwardly exactly matching the amount of metal extruded radially inwardly to provide enough metal for the cutting threads. As stated, I preferably provide a pointed portion comprising a 40° cone as shown in Figs. 8–12. In addition, as stated, the wall 78 of said point is preferably supplementally outwardly domed or curved with a 3°–5° curve so as to aid in providing sufficient metal for the diametric cutting blades 62 at the tip 76 of the pointed portion 54, the cutting surface 90 of the cutting tool 92 being suitably concaved to produce this result.

I have shown in Figs. 13–17 an alternative species of double threaded single point screw 40′ having a pointed portion 54′ comprising a 30° cone with the wall 78′ either straight or outwardly domed in a lesser degree. While such a sharper point 54′ may be desirable for some reasons, it does not provide quite as good cutting blades 62′ at the tip 76′ as the 40° cone shown in the embodiment shown in Figs. 8–12.

I have also shown in Figs. 18–22 my invention employed in a single thread screw 40″ terminating in a single cutting edge 62″ which may be equally successfully rolled by my invention. In rolling a double threaded screw the pointed portion preferably comprises a cone having a point of between 30°–40°, preferably nearer 40°, and the double threads 58 or 58′ having a pitch angle of between 7½° to 12½°, in the embodiments shown in Figs. 8–17 having a pitch angle of approximately 10°. In the single thread embodiment shown in Figs. 18–22, however I preferably employ a pointed portion 54″ comprising a 15°–25° cone, in the embodiment shown in the drawings, a 20° cone and the single thread 58″ employed therein has a pitch angle of between 4°–8°, in the embodiment shown in the drawings exactly 5°. It is obvious, however, that my improved method is equally applicable in rolling any type of single or multiple thread type of screw.

While I have shown and described in the specification and claims the dies as rolling the screw in a vertical plane, it is obvious that the screws may be rolled in a horizontal or any other plane without departing from my invention.

It is apparent, therefore, that I have provided a novel process of making a complete screw by precision extrusion and precision rolling, that I have provided novel features in the method and apparatus for forming a blank and novel features in the apparatus and method for rolling the threads, a novel type of screw blank and various novel species of completed screws so produced by my method and apparatus with the advantages described above. It will be observed that inasmuch as the circumference of the threads is substantially the same as the circumference of the body portion, the screws may be readily inserted without difficulty, and will form a biting grip when so inserted.

It is understood that my invention is not limited to the specific embodiments shown or methods or apparatus described and that various deviations may be made therefrom without departing from the spirit and scope of the appended claims.

What I claim is:

1. The method of rolling threads on the shank and pointed portions of a screw blank having a pointed end portion having an excess of metal thereon greater than required for a conical point and a shank portion above said pointed end, which comprises rolling threads in the shank and pointed portions of said blank by applying progressively increasing radial inward pressure at equally spaced flat lanes of equal width extending spirally of said portions to force the metal radially inwardly to form spaced spiral lands of equal width and permitting the displaced metal to flow radially outwardly between said spiral lanes of pressure while confining said radial outward flow of metal to sharp continuous equally spaced ridge means of equal width while positively inhibiting any axial extrusion at the tip of said pointed end to provide two continuous equally spaced thread means of even width each tapering to a sharp cutting edge extending spirally downwardly throughout said portions, of substantially equal height throughout said shank portion and of progressively decreasing height in said pointed portion and terminating in a downwardly tapered diametric cutting edge at the tip thereof, the inward radial pressure being predetermined to extrude the metal radially inwardly in said pressure lanes in an amount sufficient to extrude sufficient metal radially outwardly to form said threads.

2. The method of rolling threads on the shank and pointed portions of a screw blank having a pointed end portion and a shank portion above said pointed end, which comprises rolling threads in the shank and pointed portions of said blank by applying progressively increasing radial inward pressure at equally spaced flat lanes of substantially equal width extending spirally of said portions to force the metal radially inwardly to form spaced spiral lands of substantially equal width and permitting the displaced metal to flow radially outwardly between said spiral lanes of pressure while confining said radial outward flow of metal to sharp continuous equally spaced ridge means of equal width while positively inhibiting any axial extrusion at the tip of said pointed end to provide continuous equally spaced thread means tapering to a sharp cutting edge extending spirally downwardly throughout said portions, of substantially equal height throughout said shank portion and of progressively decreasing height in said pointed portion and terminating in a cutting edge at the tip thereof, the inward radial pressure being predetermined to extrude the metal radially inwardly in said pressure lanes in an amount sufficient to extrude sufficient metal radially outwardly to form said threads.

3. Apparatus for use in rolling threads on screw blanks having a pointed lower end portion having an excess of metal thereon greater than required for a conical point and a shank portion of uniform circumference above said pointed end portion, comprising a stationary die, a movable die, means to move said movable die over said stationary die in contacting engagement therewith, each die having a face comprising a continuous cavity having a lower wall inclined slightly upwardly from front to rear having a cooperating substantially flat shank forming portion and a point forming portion tapering outwardly to the surface of said die beyond said cavity substantially abutting the opposite die surface, all such portions being of less respective depth than the radii of the corresponding blank portions to progressively extrude metal from said blank radially inwardly to form continuous equally spaced lands of equal width in said portions, each face having continuous equally spaced thread forming groove means each of substantially uniform width throughout its length and terminating in sharp intaglio ridge means extending obliquely inwardly thereof to a predetermined depth at substantially equally spaced distances throughout the height of said face through said shank and pointed portions of substantially equal depth in said shank portion and of progressively decreasing depth in said pointed portion, to receive the metal progressively extruded radially outwardly by said inclined lanes of pressure between said grooves and confine it to form two continuous equally spaced threads of even width each tapering outwardly to a sharp continuous spiral cutting edge of even height throughout said shank portion and progressively decreasing height in said pointed portion and terminating in a downwardly tapering diametric cutting edge at the tip thereof.

4. Apparatus for use in rolling threads on a screw blank having a pointed lower end portion and a shank portion of uniform circumference above said pointed end portion, comprising a stationary die, a movable die, means to move said movable die over said stationary die in contacting engagement therewith, each die having a face comprising a continuous cavity having a lower wall inclined slightly upwardly from front to rear having a cooperating substantially flat shank forming portion and a point forming portion tapering outwardly to the surface of said die beyond said cavity substantially abutting the opposite die surface, all such portions being of less respective depth than the radii of the corresponding blank portions to progressively extrude metal from said blank radially inwardly to form continuous equally spaced lands of equal width in said portions, each face having continuous equally spaced thread forming groove means of substantially uniform width throughout the length thereof each terminating in a sharp intaglio ridge extending obliquely inwardly thereof to a predetermined depth at substantially equally spaced distances throughout the height of said face through said shank and pointed portions, of substantially equal depth in said shank portion and of progressively decreasing depth in said pointed portion, to receive the metal progressively extruded radially outwardly by said inclined lanes of pressure between said grooves and confine it to form continuous thread means of even width tapering outwardly to a sharp continuous spiral cutting edge of even height throughout said shank portion and progressively decreasing height in said pointed portion and terminating in a cutting edge at the tip thereof.

5. A pair of relatively movable one piece screw thread rolling dies having opposing surfaces adapted to contact each other in use, each having a face comprising a continuous cavity having a lower wall inclined slightly upwardly from front to rear having a cooperating substantially flat shank forming portion and a point forming portion tapering outwardly to the surface of said die beyond said cavity, each face having continuous equally spaced thread forming groove means each of substantially uniform width throughout its length and terminating in a sharp intaglio ridge extending obliquely inwardly thereof at substantially equally spaced distances throughout the height of said face through said shank and pointed portions, of substantially equal depth in said shank portion and of progressively decreasing depth in said pointed portion.

6. A pair of relatively movable one piece screw thread rolling dies having opposing surfaces adapted to contact each other in use, each having a face comprising a continuous cavity having a lower wall inclined slightly upwardly from front to rear having a cooperating substantially flat shank forming portion and a point forming portion tapering outwardly to the surface of said die beyond said cavity, each face having continuous thread forming groove means each of substantially uniform width throughout its length and terminating in a sharp intaglio ridge extending obliquely inwardly thereof at substantially equally spaced distances throughout the height of said face through said shank and pointed portions, of substantially equal depth in said shank portion and of progressively decreasing depth in said pointed portion.

7. A one piece screw thread rolling die having a face comprising a continuous cavity having a lower wall inclined slightly upwardly from front to rear having a cooperating substantially flat shank forming portion and a point forming portion tapering outwardly to the surface of said die beyond said cavity, said face having continuous equally spaced thread forming groove means each of substantially uniform width throughout its length and terminating in a sharp intaglio ridge extending obliquely inwardly thereof at substantially equally spaced distances throughout the height of said face through said shank and pointed portions, of substantially equal depth in said shank portion and of progressively decreasing depth in said pointed portion.

8. A one piece screw thread rolling die having a face comprising a continuous cavity having a lower wall inclined slightly upwardly from front to rear having a cooperating substantially flat shank forming portion and a point forming portion tapering outwardly to the surface of said die beyond said cavity, said face having continuous thread forming groove means each of substantially uniform width throughout its length and terminating in a sharp intaglio ridge extending obliquely inwardly thereof at substantially equally spaced distances throughout the height of said face through said shank and pointed portions, of substantially equal depth in said shank portion and of progressively decreasing depth in said pointed portion.

WILLIAM A. DEVELLIER.